Patented July 15, 1952

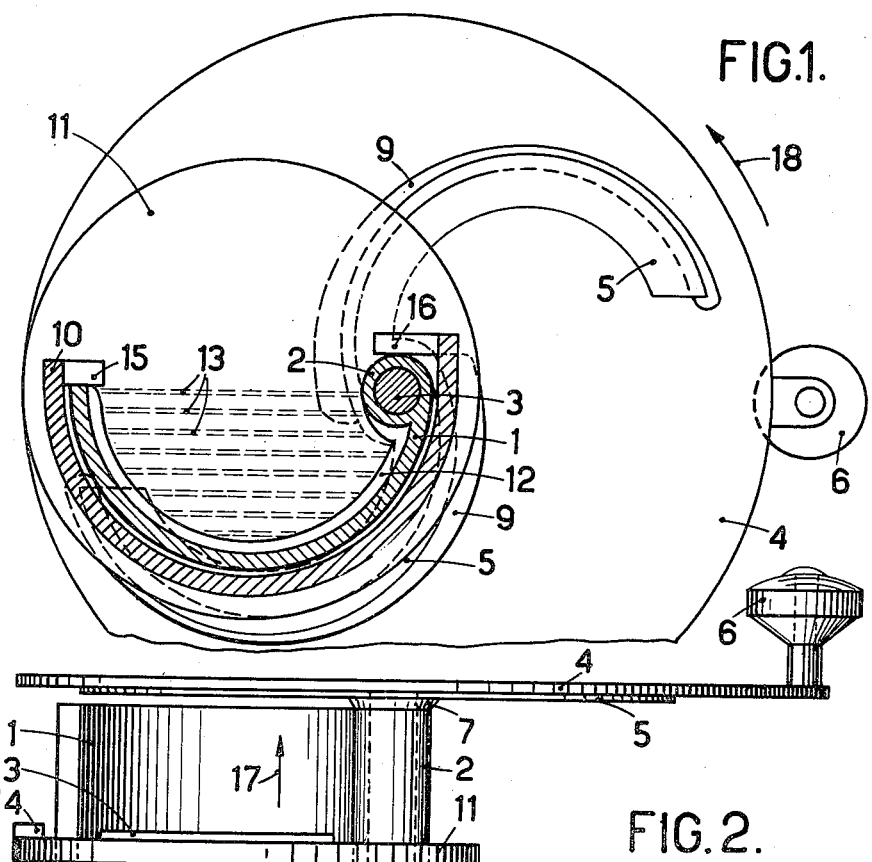

2,603,263

UNITED STATES PATENT OFFICE 2,603,263

HAND SLICING DEVICE

Eduard Schreier, Riehen, near Basel, Switzerland

Application March 19, 1951, Serial No. 216,334
In Switzerland April 5, 1950

5 Claims. (Cl. 146—113)

This invention relates to a cutting device, especially for foodstuffs, in which the material to be cut is fed by means of a hand-operated feed device to a cutter disc, which is rotatable by hand about a horizontal axis and is provided with slots and knives, characterised in that the cutter disc is rotatably mounted at one end of a trough parallel to the axis of rotation and intended for receiving the material to be treated. A slider is guided for longitudinal displacement in respect to this trough, which slider is provided with a holder adapted to be held in the hand and also with a pusher projecting into the trough for advancing the material to be cut, the parts being so constructed and arranged that the operator can hold the device with the hand which grasps the slider, can turn the cutting disc with the other hand and can control the advance of the material to be cut by displacing the slider longitudinally or axially with respect to the trough. With a suitable construction of cutting device of this kind the control of the advance of the slider and thus of the material to be cut can be excellently adapted to the conditions at any time determined by the nature of the material to be cut and thus an excellent slicing can be obtained. The most varied substances can, therefore, be cut without difficulties, for example vegetables, whether potatoes, beetroot, onions or other kinds of vegetables, also sausages and indeed not only solid permanent sausages but also soft sausages, for example Wienerli, also the most varied kinds of cheese and the like.

The drawing shows one embodiment by way of example.

Fig. 1 is a cross-section on the line A—A of Fig. 2, and Fig. 2 is a plan view.

A horizontal trough 1 which consists, for example, of Plexiglas, is provided at its right-hand margin with a tubular bearing 2 which lies parallel to the axis of the trough and serves to journal a rotary shaft 3 to one end of which is secured a cutter disc which consists of the disc body 4, two curved knives 5 secured thereto and a crank 6 for manual operation. Between the cutter disc and the trough 1 there is arranged a spacer disc 7 in order to ensure a certain clearance between the trough and the knives. The free end of the rotary shaft 3 is screw-threaded and has a nut 8 screwed on so that the trough and the cutter disc are safeguarded against relative longitudinal displacement.

The disc body 4 is provided in the neighbourhood of the sickle-shaped knives 5 with slots 9, also of sickle shape, through which the cut material can pass.

On the trough 1 a slider is mounted for longitudinal displacement which is provided with a holder 10 embracing the lower side of the trough and with a front wall 11 at the end facing the cutter disc. The front wall 11 is provided with a slot 12 through which pass the walls of the trough. The part of the front wall 11 which projects into the trough and serves as a pusher for the material to be cut is provided on the side facing the cutter disc with ledge-shaped projections 13 for holding material to be cut. The front wall 11 is also provided on the same side with a stop 14 which co-operates to limit the stroke of the slider with the margin of the disc body 4 lying outside the range of the knives 5. The holder 10 is provided on both longitudinal margins with inwardly projecting lugs 15 and 16 which engage over the margin of the trough 1 or the bearing 2 and serve to guide the slider.

In use the holder 10 is grasped with the left hand and held so that the trough 1 assumes a horizontal position. Thereupon the slider is withdrawn in a direction opposite to that shown by the arrow 17 as far as is necessary to allow the desired material to be cut to be introduced into the trough 1 between the front wall 11 and the cutter disc. The crank 6 is then grasped with the right hand and the cutter disc is set in rotation in the direction of the arrow 18. Meanwhile by pressing the two hands axially towards one another the slider is advanced over the trough 1 in the direction of the arrow 17 so that the material to be cut is engaged by the knives 5 and cut into slices. Meanwhile the advance of the slider can be controlled as desired in accordance with the requirements at any time of the material to be cut and can be spontaneously interrupted at any time by releasing the pressure exerted by the two hands towards one another.

What I claim is:

1. A manually supported and operated cutting device of the class described, including an elongated trough for receiving the material to be treated, said trough having a tubular bearing on one side thereof, a shaft rotatably mounted in said bearing, a cutter disc connected to said shaft and extending transversely of the trough at one end thereof, and a slider movably engaging the outer surface of the trough, said slider having a front end wall extending transversely of the trough and provided with a slot through which the trough loosely extends so that the slider is longitudinally displaceable relative to the trough, the part being constructed and arranged so that the slider may be held in one hand and the cutter operated by the other hand.

2. A manually supported and operated cutting device of the class described, including an elongated trough for receiving the material to be treated, said trough having an inner side thereof at its upper edge provided with a longitudinally disposed tubular bearing, a shaft rotatably mounted in said bearing, a cutter disc connected to said shaft and extending transversely of the trough at one end thereof, a slider movably engaging the outer surface of the trough, said slider having a front end wall extending transversely of the trough and provided with a slot through which the trough loosely extends so that the slider is longitudinally displaceable relative to the trough, the material to be treated being positioned in the trough between the front wall and the cutter, and means on the front wall for maintaining the material in a fixed position during the cutting operation, the part being constructed and arranged so that the slider may be held in one hand and the cutter operated by the other hand.

3. In a cutting device according to claim 2, said slider embracing the underside of the trough and being provided with lugs engaging over the sides of said trough.

4. In a cutting device according to claim 1, said front wall being provided on the side facing the cutter disc with projections for holding material to be cut.

5. In a cutting device according to claim 1, said cutter disc being provided with sickle-shaped cutting knives and slots for the passage of the cut material.

EDUARD SCHREIER.

REFERENCES CITED

The following references are of record in the file of this patent:

UNITED STATES PATENTS

| Number | Name | Date |
|---|---|---|
| 214,809 | Burdick | Apr. 29, 1879 |
| 608,604 | Hostetter | Aug. 9, 1898 |
| 783,836 | Johnson | Feb. 28, 1905 |
| 1,155,965 | Smith | Oct. 5, 1915 |
| 1,722,135 | Visher | Aug. 5, 1930 |

FOREIGN PATENTS

| Number | Country | Date |
|---|---|---|
| 159,624 | Switzerland | Apr. 1, 1933 |
| 766,847 | France | July 4, 1934 |
| 592,344 | Great Britain | Sept. 16, 1947 |